C. UNDERWOOD.
BELT-GEARING.
No. 175,529. Patented March 28, 1876.
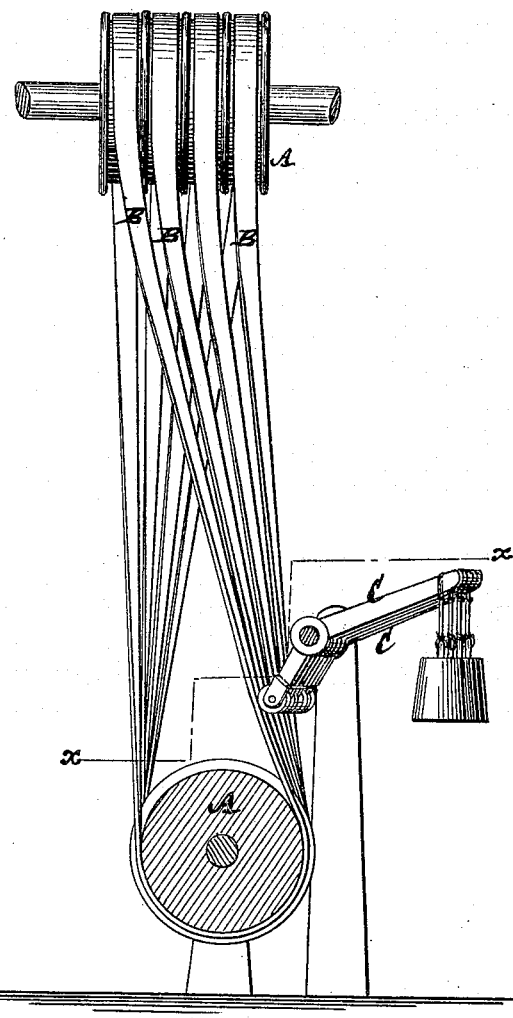
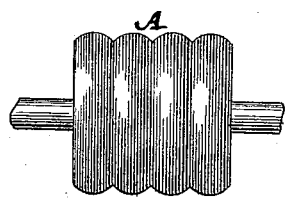
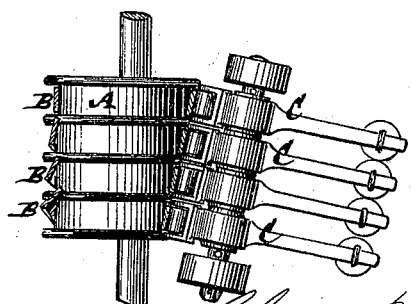
Witnesses
John Becker
Fred. Haynes
Charles Underwood
by his Attorneys
Brown & Allen

UNITED STATES PATENT OFFICE.

CHARLES UNDERWOOD, OF HARTFORD, CONNECTICUT.

IMPROVEMENT IN BELT-GEARINGS.

Specification forming part of Letters Patent No. 175,529, dated March 28, 1876; application filed March 11, 1876.

*To all whom it may concern:*

Be it known that I, CHARLES UNDERWOOD, of the city and county of Hartford, and State of Connecticut, have invented certain new and useful Improvements in Belts and Pulleys; and I do hereby declare that the following is a full, clear, and exact description of the same, reference being had to the accompanying drawing, which forms part of this specification.

This invention relates more particularly to belts and pulleys for communicating power, in which an extended or broad belt-bearing surface is required to communicate power from one pulley to another.

In using a single broad belt for such purpose, which has been the practice heretofore, it has been necessary to increase the thickness of the belt as its width has been increased. This involves increased rigidity of the belt; whereas, to insure its close hug of the pulleys and uniform contact therewith throughout its width, flexibility is requisite.

To remove these difficulties I propose to use, in the place of a single belt, a series—that is, two or more—of independent and comparatively narrow belts, for communicating power from one pulley to another pulley. These belts may be made much lighter or thinner than a single broad belt, which is not only a saving as regards material, but such belts are more flexible and have a closer hug or more uniform bearing throughout their width on the two pulleys. As, however, such independent belts might not be of an equal tightness at all times, and to insure their uniform joint action it is necessary that they should be so, I combine with said belts a corresponding number of independent automatic belt-tighteners.

The combination of independent belts, with or without the independent automatic belt-tighteners, is more especially designed for what are known as turned-belt-driving arrangements, in which the driving and driven pulley, instead of having their axes parallel with one another, have their axes at an angle with each other—that is, at right angles with one another for a quarter-turn belt or belts, and corresponding angles for belts having a greater or less turn.

When a turned single broad belt is used to connect the two pulleys, the rigidity of the belt causes the latter to have a very uncertain or unequal pressure all across the pulleys, and gives such twist to the belt that it is very sensibly lifted at its one edge from all contact with either pulley; and this difficulty increases as the diameter of the pulleys is diminished, or as the ratio of the width of the belt increases relatively to the diameters of the pulleys.

These objections are almost, if not entirely, obviated by my system of independent and comparatively narrow and flexible series of belts connecting the two pulleys.

Having thus described the objects and nature of the invention at length, it will only be necessary here briefly to refer to the arrangement I have selected in the drawing by way of illustrating the same.

Figure 1 shows a partially-sectional elevation of two pulleys, having their axes at right angles with each other, and connected, by a series of quarter-turn belts, with independent automatic tighteners applied to the several belts. Fig. 2 is an irregular horizontal section of the same on the line *x x*, and Fig. 3 a longitudinal view of a modified construction of either pulley.

A A are the two pulleys, connected by a series of independent comparatively narrow and flexible quarter-turn belts, B B, which are kept separate from each other, either by means of flanges on the pulleys, as shown in Fig. 1, or by constructing the pulleys with a series of crowning or rounded surfaces for the belts to hug and run on or over, as shown in Fig. 3. C C are the independent automatic tighteners, one of which is applied to either belt, to insure a uniform tension of the several belts.

The invention is only shown as applied to flat belts, but in some instances it might be applied to round ones.

I claim—

1. The combination, with two pulleys having their axes in angular relation with each other, and the one of which serves to drive the other, of two or more independent belts, connecting said pulleys at different portions of their width, substantially as specified.

2. The combination, with two pulleys, the one of which drives the other, of a series of independent belts, connecting said pulleys at different portions of their width, and a series of independent automatic belt-tighteners applied to said belts, essentially as described.

CHARLES UNDERWOOD.

Witnesses:
SIDNEY E. CLARK,
WILLIAM J. TULLER.